United States Patent
Raphel et al.

(10) Patent No.: US 8,341,415 B1
(45) Date of Patent: Dec. 25, 2012

(54) PHRASE MATCHING

(75) Inventors: Jose Raphel, Austin, TX (US); Kailash Kailash, San Jose, CA (US); Narasimha Datta Nataraja, Bangalore (IN)

(73) Assignee: Zscaler, Inc., San Jose, CA (US)

( * ) Notice: Subject to any disclaimer, the term of this patent is extended or adjusted under 35 U.S.C. 154(b) by 955 days.

(21) Appl. No.: 12/185,481

(22) Filed: Aug. 4, 2008

(51) Int. Cl.
  *H04L 9/32* (2006.01)
(52) U.S. Cl. ........... 713/180; 713/189; 726/1; 726/6; 726/26
(58) Field of Classification Search .......... 726/6
See application file for complete search history.

(56) References Cited

U.S. PATENT DOCUMENTS

| | | | |
|---|---|---|---|
| 4,773,039 A * | 9/1988 | Zamora | 715/256 |
| 5,469,354 A * | 11/1995 | Hatakeyama et al. | 1/1 |
| 6,173,280 B1 * | 1/2001 | Ramkumar et al. | 1/1 |
| 6,381,594 B1 * | 4/2002 | Eichstaedt et al. | 1/1 |
| 7,984,102 B1 * | 7/2011 | Raphel et al. | 709/206 |
| 2001/0021928 A1 * | 9/2001 | Ludwig et al. | 705/67 |
| 2005/0154708 A1 * | 7/2005 | Sun | 707/3 |
| 2005/0182606 A1 * | 8/2005 | Chida et al. | 703/2 |
| 2006/0031195 A1 * | 2/2006 | Patterson | 707/3 |
| 2006/0136749 A1 * | 6/2006 | Satou et al. | 713/193 |
| 2007/0192617 A1 * | 8/2007 | Brickell | 713/183 |
| 2008/0212770 A1 * | 9/2008 | Satou et al. | 380/44 |
| 2008/0263360 A1 * | 10/2008 | Haitsma et al. | 713/180 |
| 2008/0312902 A1 * | 12/2008 | Dollinger | 704/4 |
| 2009/0006607 A1 * | 1/2009 | Bu et al. | 709/224 |
| 2009/0089048 A1 * | 4/2009 | Pouzin | 704/10 |
| 2009/0313115 A1 * | 12/2009 | Konig et al. | 705/14.45 |
| 2009/0313269 A1 * | 12/2009 | Bachmann | 707/100 |
| 2010/0293159 A1 * | 11/2010 | Zhang et al. | 707/728 |

OTHER PUBLICATIONS

Hammouda et al., "Phrase-based Document Similarity Based on an Index Graph Model," 2002, IEEE, pp. 203-211.*
Wiehe et al., "Quantitative Analysis of Efficient Antispam Techniques," 2006, IEEE, pp. 163-172.*
Cannane et al., "A General-Purpose Compression Scheme for Large Collections," 2002, ACM Transactions on Information Systems, vol. 20, No. 3, pp. 329-355.*

* cited by examiner

*Primary Examiner* — Luu Pham
(74) *Attorney, Agent, or Firm* — Clements Bernard PLLC; Lawrence A. Baratta, Jr.; Christopher L. Bernard

(57) ABSTRACT

Methods, systems, and apparatus, including computer program products, for generating or using augmentation queries. In one aspect, a set of phrase terms of a phrase are received in first ordinal positions, and a set of first hashes for each of the phrase terms. Concatenated hashes from the set of first hashes are generated. Hashes of content terms for received content are compared to the concatenated hashes to determine if a phrase is detected in the content.

17 Claims, 6 Drawing Sheets

PHRASE MATCHING

BACKGROUND

This specification relates to data leakage detection.

The unauthorized distribution of confidential information, such as trade secrets, financial information, and other sensitive information can be protected by a number of security measures, such as access restrictions, password protection, and encryption techniques. While such security measures are often effective, confidential information that is subject to such measures can still be distributed inadvertently or surreptitiously. Such disclosures can be characterized as "data leaks." For example, confidential information can be communicated by text in an e-mail message or an instant message; by attaching a document to an e-mail message; by accessing a company website over an unsecured network; and so on. Whether committed unintentionally or intentionally, the disclosure of confidential information by data leakage can cause financial harm, embarrassment, or other injury to a company or individual.

There are many different data leakage protection schemes, such as regular expression checkers that identify structured data (e.g., credit card numbers); database fingerprint matching; file matching (either complete or partial); statistical analysis; and so on. One particular protection scheme is phrase matching, which is a technique of matching regular expressions in the presence of noisy words. FIG. 1 illustrates a state diagram of a phrase matching model that is configured to detect the phrase "Private And Confidential." Normally phrases are matched using regular expressions (w1*w2*w3), and other words within a noise margin are ignored. For example, matching a formatted string "<bold>Private </bold> and <bold> Confidential </bold>" would treat <bold> and </bold> as noise. Too much noise indicates too many words in between the phrase terms, and cause state model to revert to a previous state. For example, the sentence "Private information, and requires the authentication of confidential data access privileges" includes the phrase words for "Private And Confidential." However, the sentence includes too many noise words that obfuscate the intent of the original phrase.

Transition tables can be used to implement the state model. For a K-word phrase, however, there are K+1 forward states and K−1 noise states, which amounts to a transition table size of $K^2$. Thus, as more phrases are added, the state model grows more complex, and computational resource requirements likewise increases geometrically.

SUMMARY

In general, one aspect of the subject matter described in this specification can be embodied in methods that include the actions of receiving a set of phrase terms of a phrase, the phrase terms being in a first ordinal positions; generating a set of first hashes, the set of first hashes including a first hash of each of the phrase terms; and generating concatenated hashes from the set of first hashes, the concatenated hashes including a concatenation of the set of first hashes according the first ordinal positions of the phrase terms, and concatenations of proper subsets of the set of first hashes according to the first ordinal positions of the phrase terms. Other implementations of this aspect include corresponding systems, apparatus, and computer program products.

Another aspect of the subject matter described in this specification can be embodied in methods that include the actions of receiving content, the content including content terms in second ordinal positions; generating a set of second hashes, the set of second hashes includes a second hash for each of the content terms; selecting the second hashes according to an increasing order of the second ordinal positions; comparing the selected second hashes of the content terms to the concatenated hashes and the first hashes; and determining a phrase detection of the phrase has occurred if selected second hashes match at least one comparison to the concatenated hashes or first hashes. Other implementations of this aspect include corresponding systems, apparatus, and computer program products.

Another aspect of the subject matter described in this specification can be embodied in methods that include the actions of identifying subject phrases for detection in content, each phrase having a corresponding cardinality of terms; generating first hash sets for each of the subject phrases, each first hash set including first hashes of bigram term subsets for each of the phrases; and assigning a sub-phrase score for each of the hashes, each sub-phrase score based on the cardinality of each phrase. Other implementations of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

A phrase detection system 100 matches phrases in content that are intermixed with noise words to known phrases. In an implementation, phrase terms of phrases that are indicative of sensitive or protected content, such the terms of the phrases "Private and Confidential," "Private and Billing Confidential" and "Privileged and Confidential," are arranged in sets and proper subsets. The system 100 uses a phrase word unigram, such as, for example, a hash of a phrase word, for admitting a content term into a test window. Once the content window stores a number of phrase terms equal to a minimum phrase length, the system 100 processes the content terms in the window to determine if the content terms matches one of the known phrases. In some implementations, one or more matches are computed by a sequence of k-gram hashes of the content terms and evaluating the score recorded against scores for k-gram hashes of the known phrases.

§2.0 Example Operating Environment

Figure 2A:
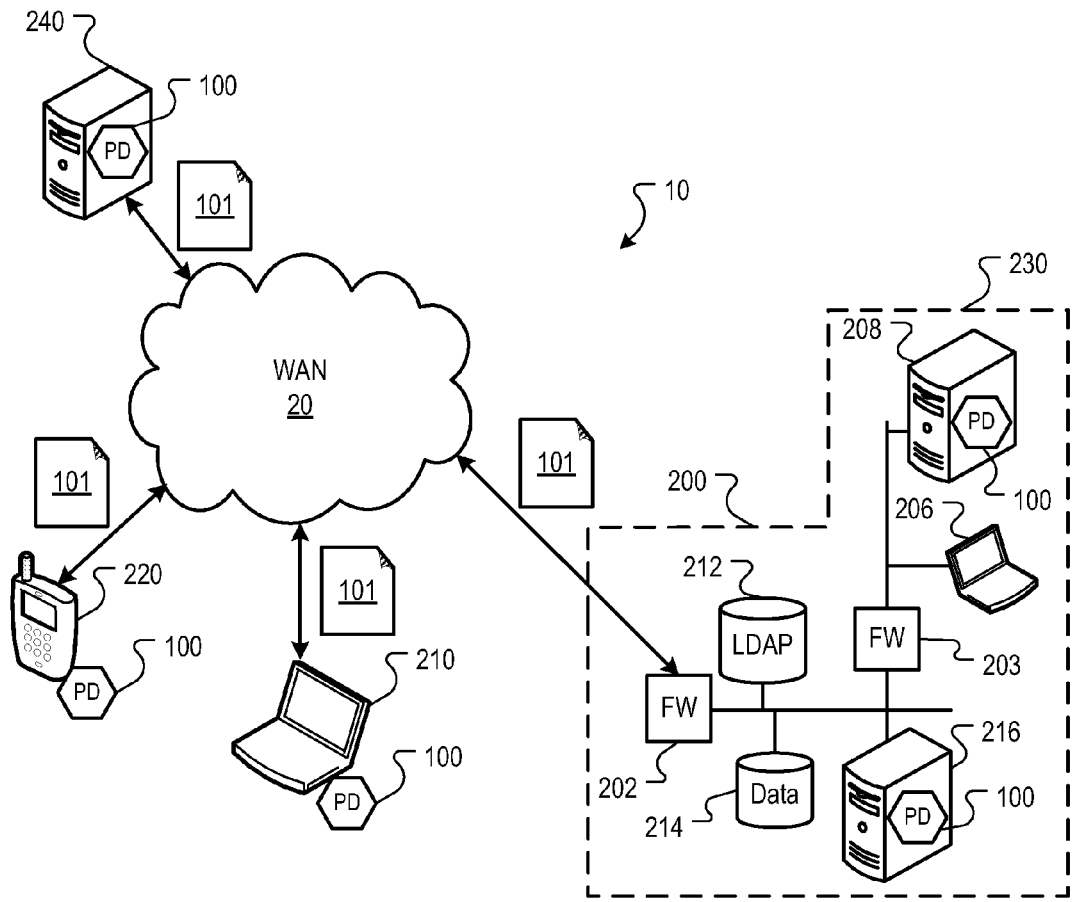
FIG. 2A is a block diagram illustration of a network environment in which a phrase detector can be used.

FIG. 2A is a block diagram illustration of a network environment 10 in which a phrase detector can be used. A wide area network (WAN) 20, such as the Internet, or some other combination of wired and/or wireless networks, connects in data communication multiple computer systems 200, 210, 220, and 230.

The computer system 200 comprises an enterprise computer system, and includes a firewall 202 protecting an internal network that can include one or more enterprise servers 216, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 20 through one or more network devices, such as a router, gateway, etc. The LDAP server 212 may store, for example, user login credentials for registered users of the enterprise system 200. Such credentials can include a user identifiers and login passwords. The other data 214 can include sensitive content, such as bank records, medical records, trade secret information, or any other information warranting protection by one or more security measures.

The computer device 210 and the mobile device 220 can also store content warranting security measures, such as personal bank records, medical information, and login information, e.g., login information to the server 216 of the enterprise 200, or to some other secured data provider server.

Content can be distributed in a variety of ways. For example, content 101 can include e-mail messages, text messages, instant messages, files provided as attachments to messages or provided in response to requests, e.g., file transfer protocol (ftp) requests, etc. Other distribution methods can also be used, such as, for example, copying a file to a universal serial bus (USB) flash memory device, a floppy disk, and the like. Each distribution of content 101 is a potential data leak.

To guard against such data leaks, the phrase detection system 100 can be used to process the content 101 prior to distribution (or during distribution). The phrase detection system 100 can be implemented as in software that includes instructions that are executable by a processing system, and upon such execution cause the processing system to perform the operations described below. Thus, the phrase detection system 100 can be instantiated in any number of different processing devices, such as in the user computer 208; a company server 216; a user's private computer 210, or even on a mobile device 220.

In some implementations, the phrase detection system 100 can be included a security system that is external to a network edge of an enterprise or user system and that provides "in the cloud" security services to the enterprise or user system. For example, a security service 240 can be cooperatively configured with the enterprise system 200 or the user systems 210 and 220 to process all traffic sent to and received from the enterprise system 200 or the user systems 210 and 220. The processing can include phrase detection by use of the phrase detection system 100.

§3.0 Example Phrase Detection System Implementation

Figure 1:
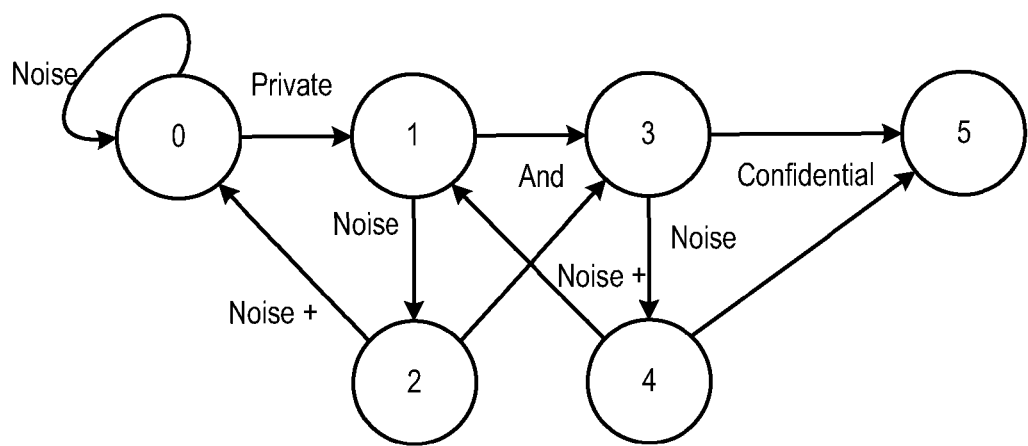
FIG. 1 illustrates a state diagram for one phrase in a phrase matching model.
Figure 2B:
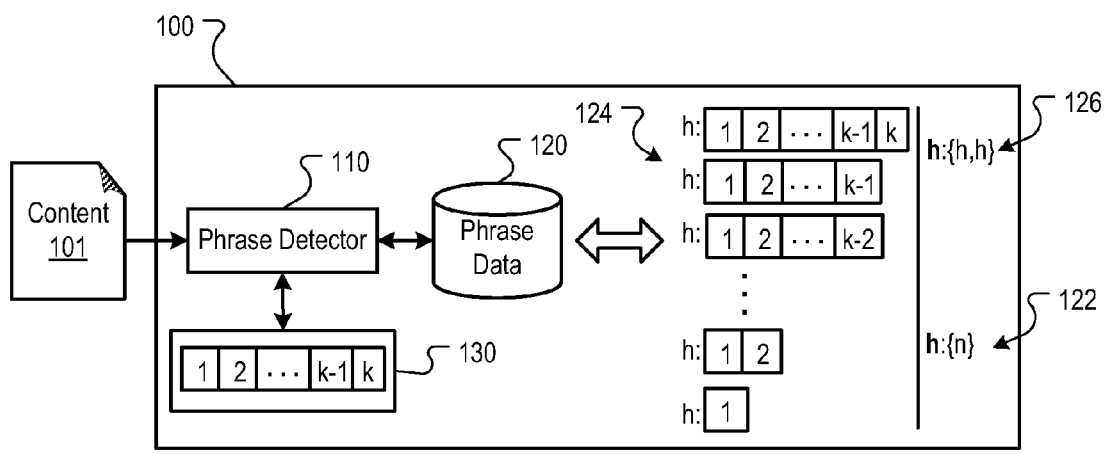
FIG. 2B is a block diagram of an example phrase detector.

FIG. 2B is a block diagram of the example phrase detection system 100 used in FIG. 1. The phrase detection system 100 includes a phrase detector 110, a phrase data store 120, and an instantiation of a content window buffer 130.

§3.1 Phrase Detection Data

To configure the phrase detection system 100, a user can input one or more phrases that are indicative of confidential or sensitive information. The phrases include phrase terms, which may be letters, numbers, or other data representations of information, and can include 1 or more of such phrase terms. The phrase terms and subset of each of the phrase terms can be stored in the phrase data store 120 after receipt in the phrase detection system 100.

In some implementations, the phrase terms are hashed by the phrase detector 110, and the resulting hashes 122 are used to create concatenated hashes. The concatenated hashes can include concatenations 124 of the hashes for the phrase terms in the same order as the ordinal positions of the phrase terms in the phrase. The concatenations can also include concatenations 126 of proper subsets of hashes in the first set according to the ordinal positions. In some implementations, to facilitate storage and fast look-up, each of the concatenations can also be hashed, as represented by the hashing operator "h:" in FIG. 2B.

For example, suppose an enterprise determines that three phrases, P1 ("privileged and confidential"), P2 ("private and billing confidential") and P3 ("private and confidential"), can be used to identify confidential content. For the three phrases P1, P2 and P3, the hashes listed in Table 1 below can be stored as phase detection data (e.g., data 122, 124 and 126, in the phrase data store 120.

TABLE 1

| Unigrams | Bigrams | K-grams |
| --- | --- | --- |
| h1 = h(privileged) | h6 = h(h1.h2) | h11 = h(h1.h2.h3) |
| h2 = h(and) | h7 = h(h2.h3) | h12 = h(h4.h2.h5.h3) |
| h3 = h(confidential) | h8 = h(h4.h2) | h13 = h(h4.h2.h3) |
| h4 = h(private) | h9 = h(h2.h5) | |
| h5 = h(billing) | h10 = h(h5.h3) | |

The unigram column of Table 1 lists hashes of each phrase term included in the phrases P1, P2 and P3. Because the phrase terms P1, P2 and P3 include five unique words, only five unigram hashes are required.

The bigram column of Table 1 lists hashes of concatenations of proper subsets of the set phrase terms, and each of the proper subsets having a cardinality of two. Each concatenation is in the order of the ordinal position of the phrase of which it is a subset. For example, the hash h6, which is h(h1.h2), is a hash of the concatenation of h1 and h2, which represents "privileged and", a bigram found in phrase P1. Likewise, h7 represents "and confidential," a bigram found in P1 and P3; h8 represents "private and," a bigram found in P2 and P3; h9 represents "and billing," a bigram found in P2; and h10 represents "billing confidential," a bigram found in P2.

The K-grams column of Table 1 lists a hash for each concatenation of the set of hashes according the ordinal positions of its corresponding phrase. For example, the hash h11, which is h(h1.h2.h3), is a hash of the concatenation of h1, h2 and h3, represents "privileged and confidential." Likewise, h12 represents "private and billing confidential;" and h13 represents "private and confidential."

The example data of Table 1 includes only unigram hashes, bigram hashes and K-gram hashes (i.e., a concatenation of all phrase term hashes according to the ordinal position of the phrase terms). In other implementations, all n-gram hashes for n=1 . . . k can also be used. Additionally, a variety of hashing algorithms can be used, such as MD5, CRC64, MD32, MD64, or combinations of CRC64 and MD32 or MD64. In some implementations, the hash functions are collision resistant.

The hashes of Table 1 are also associated with phrase score and sub-phrase scores that are used in a scoring process for detecting phrases. A phrase score is associated with the concatenation of the first hashes for the first set of phrase terms, and sub-phrase scores are associated with the concatenations of proper subsets, e.g., unigrams. Sub-phrase scores can also be associated with each hash of a phrase term as well.

In some implementations, an optional scoring process can be used. Each phrase term represented by its hash is given a score. If there are K words in a phrase, the unigram hashes (hashes of each of the phrase terms in isolation) are denoted by $h_{1,1}, h_{1,2}, \ldots, h_{1,k}$ and are given sub-phrase scores of $N/2^{k-1}$; the bigram hashes are denoted by $h_{2,1}, h_{2,2}, \ldots h_{2,k-1}$ and are given sub-phrase scores of $N/2^{k-2}$; and the k-gram hash is denoted by $h_{k,1}$ and are given the phrase scores N, which is representative of the entire phrase:

$$\text{score}(h_{k,1}) = N/2^0 \ldots \text{K-gram}$$

$$\text{score}(h_{k-1,1}) + \text{score}(h_{k-1,2}) = N/2^1 \ldots \text{K-1 gram}$$

. . .

$$\Sigma \text{score}(h_j, i) = N/2k - j \ldots \text{j-gram for some } 0 \leq j \leq = k$$

$$i = 1, k - j + 1$$

In some implementations, the scoring can be based on a maximum phrase length of the known phrases. For example, for the phrases P1, P2 and P3, the maximum phrase length is 4 ("private and billing confidential"), and a multiple is selected so that the phrase score is equally divisible by 2 for $2^j$, where j=k−1. In some implementations, the score N is provided by the following formula:

$$N = (k-1)! * 128$$

In some implementations, if the maximum phrase length is an odd number, the minimal even number greater than k is used to compute N, e.g., N=k!*128. This ensures that all unigram scores will be integers for the case of K being a prime number.

The example constant 128 is selected so that all sub-phrase scores are integer values. The constant is of the form $2^{(k+b)}$ where k is the maximum phrase length and b is a non-zero integer. In the formulation above, k=4 and b is 3.

For the phrases P1, P2 and P3, the value of k=4 is selected, as the maximum phrase length is 4 (phrase P2, with a length of k=4). Accordingly, the phrase score is 768, i.e., (4−1)!*128.

The sub-phrase scores can be assigned to the bigram and unigram hashes according to the formulas above. However, the sub-phrase scores can differ for bigrams and unigrams of phrases of different lengths, and thus a bigram or unigram may have two or more associated sub-phrase scores. For example, the unigram hash h2 has associated scores of 64 and 24:

$$64 => h_{1,1} + h_{1,2} + h_{1,3} = 768/2^2$$

$$24 => h_{1,1} + h_{1,2} + h_{1,3} + h_{1,4} = 768/2^3$$

Table 2 below list the phrase scores and sub-phrase scores indexed by the hashes and concatenated hashes.

TABLE 2

| Hash | Score(s) | Representative Phrase Terms |
|---|---|---|
| h1 = h(privileged) | 64 | privileged |
| h2 = h(and) | 64, 24 | and |
| h3 = h(confidential) | 64, 24 | confidential |
| h4 = h(private) | 64, 24 | private |
| h5 = h(billing) | 24 | billing |
| h6 = h(h1.h2) | 192 | privileged and |
| h7 = h(h2.h3) | 192 | and confidential |
| h8 = h(h4.h2) | 192, 64 | private and |
| h9 = h(h2.h5) | 64 | and billing |
| h10 = h(h5.h3) | 64 | billing confidential |
| h11 = h(h1.h2.h3) | 768 | privileged and confidential |
| h12 = h(h4.h2.h5.h3) | 768 | private and billing confidential |
| h13 = h(h4.h2.h3) | 768 | private and confidential |

The sub-scores are also indicative of the phrases to which each n-gram hash belongs. For example, the unigram hashes with the score of 24 are in the set of phrase terms "private and billing confidential," and the unigram hashes with the score of 64 are in the sets of "privileged and confidential" and "private and confidential."

§3.1 Phrase Detection Data

In some implementations, phrase detection is performed is performed using the window buffer 130 of size K, where K is the maximum number of phrase terms of all phrases (e.g., K=4 for phrases P1, P2 and P3). Each slot in the buffer 130 can store a hash, such as a hash of a content term of the content 101. When a hash is matched with a hash in the hash table, the hash is entered into the window 130 and the window 130 is advanced by one position.

In some implementations, the window size can accommodate for a noise threshold, e.g., a gap length of G, where G is the maximum number of noise elements (e.g., words, symbols, etc.). In these implementations, the window is of the size:

Window Size=$K+(K-1) \times G$

Such a window size can thus store K phrase terms and G noise terms after each phrase term. Other window sizes, however, can also be used.

The phrase detector 110 can count intervening noise (e.g. terms, words, and other data that when hashed does not match one of the hashes of the phrase terms). If the noise exceeds a noise threshold, all hashes in the window 130 are deleted and a new phrase match detection is started. If the window 130 is full, and additional hashes of content terms are matched, then the window operates as a first in, first out buffer. In this manner, content terms are received and processed, e.g., hashed and compared to the hashes of the phrase terms, according to the ordinal positions at which they are received.

In some implementations, once the window includes a number of content term hashes equal to the cardinality of the set of the smallest phrase terms, e.g., 3 for P1 and P3, K-gram matches are attempted between the maximum and minimum lengths for all hashes stored in the window 130.

In some implementations, to determine if a phrase is detected, the hashes in the window 130 are tested for K-gram matches descending from the highest value of K among all the phrases to the minimum. If the generated hash matches one of the hashes with a phrase score (e.g., N), then it is treated as a phrase match and the corresponding phrase is identified as detected.

Each such n-gram match is computed from the window 130 of hashes based on the following concatenations:

$$h_{n,i} = \text{Hash}(h_{1,i}. h_{1,i+1}. \ldots h_{1,i+n-1})$$

wherein n=k; and $$h_{n,i}=\text{Hash}(\text{select}(n, [h_{1,1}.h_{1,2}. \ldots h_{1,k}]))$$

where n<k, and select is defined to select n hash elements such that between two successive elements selected there is not a gap more than the noise threshold, and the hashes of the content terms are selected in the increasing order of their indices, e.g., proper subsets of the set of content hashes in the window are selected according to the ordinal positions of the content terms.

By way of example, suppose the phrase "privileged and billing confidential" is encountered in the content 101. While this phrase is not one of the known phrases P1, P2 and P3, it nevertheless includes phrase terms in a very similar order to the orders of phrase terms in P1, P2 and P3. Thus it can be considered a phrase that is indicative of confidential information, and the content 101 in which it is contained should be precluded from being distributed. To conduct a match, first a four-gram match on the phrase terms is attempted. If a match is not detected, then a series of trigram matches can be attempted. Table 3 below illustrates the data processed by the phrase detector 110 during this detection process.

TABLE 3

| Window Data | h1, h2, h5, h3 (privileged and billing confidential) | |
|---|---|---|
| 4-gram match: | H(h1.h2.h5.h3) | (Not found) |
| 3-gram match: | H(h1.h2.h5) | (Not found) |
| 3-gram match: | H(h2.h5.h3) | (Not found) |
| 3-gram match: | H(h1.h5.h3) | (Not Found) |
| 3-gram match: | H(h1.h2.h3) | (Found) |

Because a match is found for the phrase "privileged and confidential," the content 101 can be identified as including confidential information, and appropriate actions can be taken.

In implementations using the optional phrase scores and sub-phrase scores, processing can be optimized by only selecting n-gram hashes having the same score, as hashes of n-gram phrase term subsets with different sub-phrase scores do not belong to the same phrase. For the window data h1, h2, h5, h3, Table 4 below illustrates the corresponding content term hashes in terms of proper subsets incremented according to the ordinal positions of the content term hashes and the generated phrase detection scores:

TABLE 4

| Proper Subset | n-Gram | Score(s) |
|---|---|---|
| h1 | Unigram | 64 |
| h1, h2 | Bigram | 192 |
| h2 | Unigram | 64, 24 |
| h2, h5 | Bigram | 64 |
| h5 | Unigram | 24 |
| h5, h3 | Bigram | 64 |
| h3 | Unigram | 64, 24 |

As indicated by the scores of Table 4, there are no bigram combinations that will result in a phrase detection, as the combination of the content terms of the bigram hashes having a common score of 64, i.e., h.2, h5 and h3, results in a hash value not found in Table 1. However, there is a common score of 64 for unigrams h1, h2 and h3. Thus, the hash of a concatenation of the hashes of h1, h2, and h3, i.e., H(h1.h2.h3), results in a match to the hash of the concatenation hashes of the phrase terms for "privileged and confidential." Because a match is found for the phrase "privileged and confidential," the content 101 can be identified as including confidential information, and appropriate actions can be taken.

By way of another example, if the content terms "privileged and confidential private" were processed in the window 130, the hashes for the term subsets (e.g., unigram and bigram term subsets) and phrase detection scores would be generated as in Table 5.

TABLE 5

| Proper Subset | n-Gram | Score(s) |
|---|---|---|
| h1 | Unigram | 64 |
| h1, h2 | Bigram | 192 |
| h1, h2, h3 | Trigram | 768 |
| h2 | Unigram | 64, 24 |
| h2, h3 | Bigram | 192 |
| h3 | Unigram | 64, 24 |
| h4 | Unigram | 64, 24 |

As indicated by the scores of Table 5, the trigram h1, h2, h3 is an automatic detection as the phrase score of 768 is achieved. Likewise, the bigrams h1, h2 and h2, h3 also result in a match to the phrase "privileged and confidential." Additionally, all four unigrams can also be used, for detection, which would result in a detection of the phrase "privileged and confidential" from the hashes content terms resulting in h1, h2 and h3.

In other implementations, to determine if a phrase is detected, the hashes in the window 130 are tested for K-gram matches in ascending term subset lengths, e.g., ascending from hashes of unigram terms to the highest hashes K-gram phrase length. For example, in the case in which there are two or more subject phrase of the same length, e.g., "Private and Confidential" and "Sensitive Confidential Information," a match of two adjacent bigrams having the same sub-phrase scores corresponding to the trigram phrases of "Private and Confidential" and "Sensitive Confidential Information" is indicative that either one of the phrases may have been detected. Because the bigrams overlap for each respective phrase—"Private and" and "and Confidential" for "Private and Confidential; "Sensitive Confidential" and "Confidential Information" for "Sensitive Confidential Information"—the presence of any two adjacent bigrams with hashes having same sup-phrase score for a trigram phrase indicates that one of the phrases may have been detected. In some implementations, the constituent terms that constitute the adjacent bigrams with the common scores are concatenated and hashed to determine if a corresponding tri-gram phrase is present.

Similarly, the cardinality of a phrase can also be predicted based on the sub-phrase scores. For example, if three common sub-phrase scores for bigrams are identified in adjacent bigrams, and the three sub-phrase scores correspond to sub-phrase bigram scores for a 5-gram phrase, then it follows that at least a portion of the 5-gram phrase has been identified. For example, for the phrase "Private and Confidential Client Information," the bigrams of "Private and," "and Confidential," "Confidential Client" and "Client Information" would all have the same sub-phrase score. Accordingly, the cardinality of a match, e.g., 5, can be predicted if four sub-phrases having the common sub-phrase bigram score of the 5-gram phrase are identified adjacent to each other. Thus, for a unique phrase having a unique K (i.e., the only phrase of length K=N), a K-gram match for that K=N can be found based only on K−1 (i.e., N−1) sub-phrase scores of the bigram hashes.

§4.0 Example Process Flows

Figure 3:
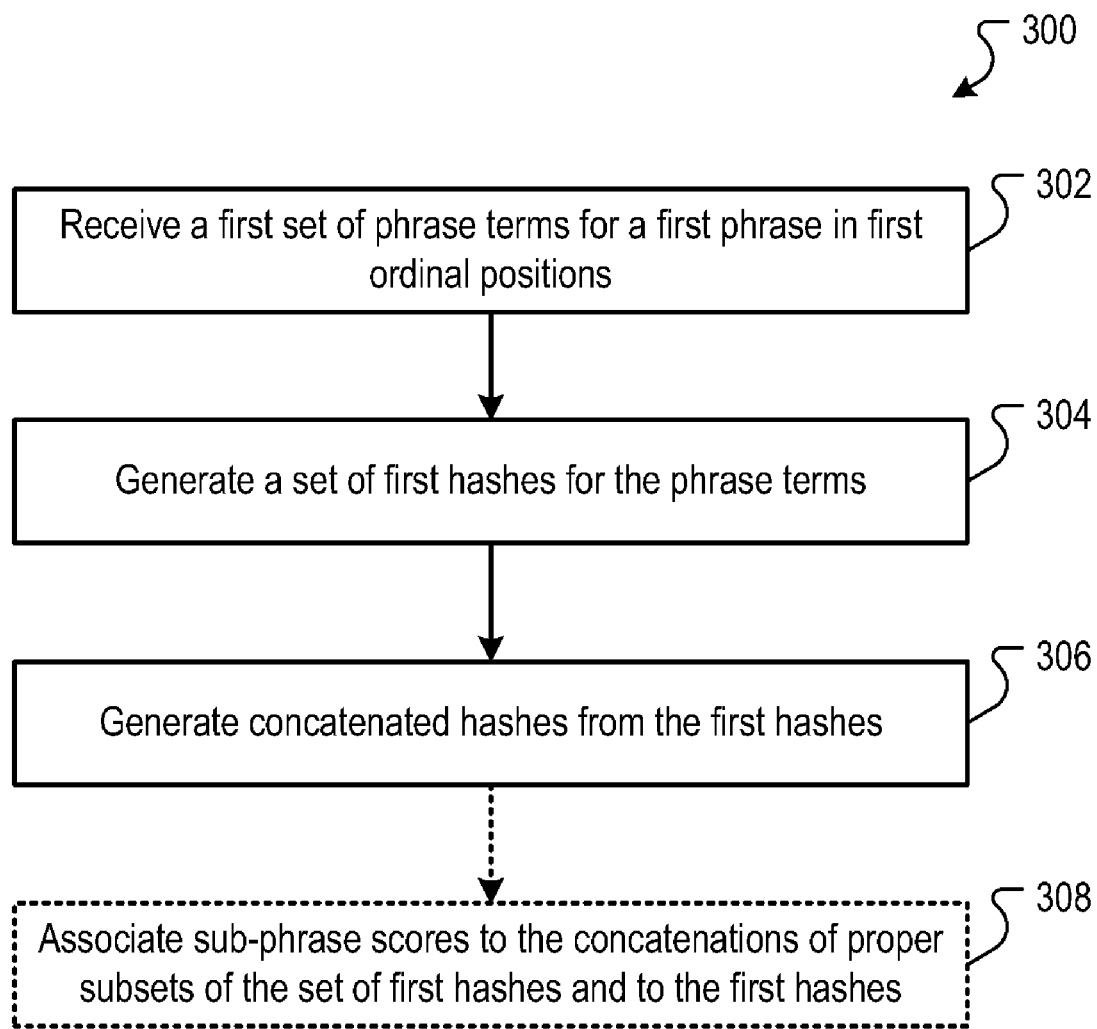
FIG. 3 is a flow diagram of an example process for generating phrase detection data.

FIG. 3 is a flow diagram of an example process 300 for generating phrase detection data. The process 300 can, for example, be used in the phrase detection system 100 of FIG. 2B.

The process 300 receives a first set of phrase terms for a first phrase in first ordinal positions (302). For example, the phrase detectors 110 can receive the phrase P1 "privileged and confidential."

The process 300 generates a set of first hashes for the phrase terms (302). For example, the phrase detector 110 can generate a set of first hashes from the phrase terms "privileged and confidential" as shown in Table 1.

The process 300 generates concatenated hashes from the first hashes (304). For example, the phrase detector 110 can generate concatenate hashes from the phrase terms "privileged and confidential" as shown in Table 1.

If an optional phrase scoring is used, the process 300 can associate sub-phrase scores to the concatenations of proper subsets of the set of first hashes and to the first hashes (306). For example, the phrase detector 110 can associate sub-phrase scores as described with reference to Table 2.

Figure 4:
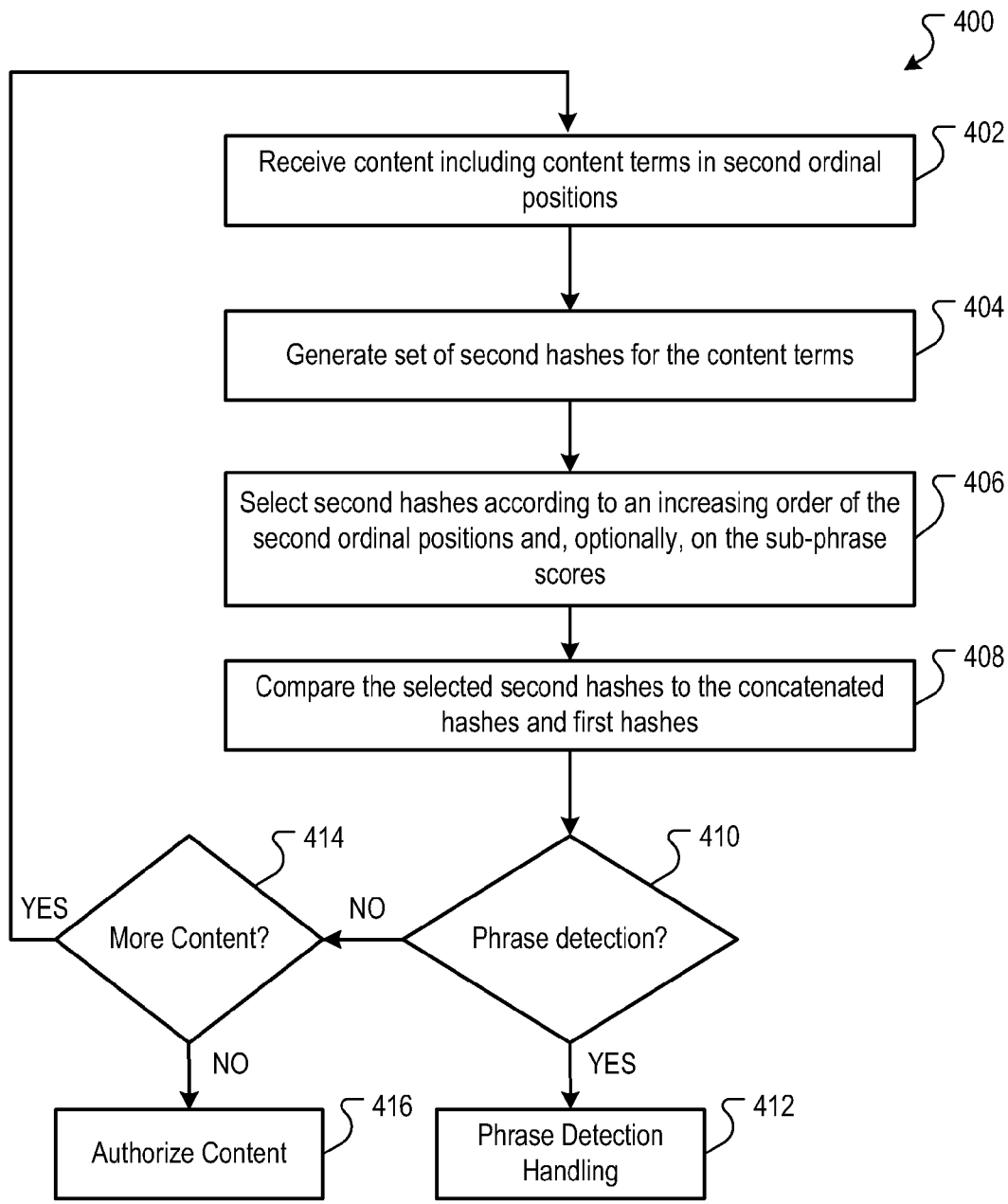
FIG. 4 is a flow diagram of an example process for detecting phrases in distributed content.

FIG. 4 is a flow diagram of an example process 400 for detecting phrases in distributed content. The process 400 can, for example, be used in the phrase detection system 100 of FIG. 2B.

The process 400 receives content including content terms in second ordinal positions (402). For example, the phrase detector 110 can receive the content terms "privileged and billing confidential" from content 101.

The process 400 generates a set of second hashes for the content terms (404). For example, the phrase detector 110 can generate a second set of hashes for the content terms "privileged and billing confidential."

The process 400 selects second hashes according to an increasing order of the second ordinal positions (406). For example, the phrase detector 110 can select hashes of the content terms, and concatenated hashes of the content terms in the increasing order of their indices, i.e., second ordinal positions.

The process 400 can, optionally, select the second hashes on the sub-phrase scores (406). For example, the phrase detector 110 can select bigrams or unigrams having common sub-phrase scores.

The process 400 compares the selected second hashes to the concatenated hashes and first hashes (408). For example, the phrase detector 110 can compare the hashes as described with respect to Table 3 above.

The process 400 determines if there is a phrase detection based on the comparison (410). For example, the phrase detector 110 can determine there is a phrase detection is a hash of the selected second hashes matches a hash of the concatenated first hashes.

If the process 400 determines there is a phrase detection, then the process 400 initiates a phrase detection handling routine (412). For example, the phrase detector 110 may preclude distribution of the content 101, or strip the content from a message if the content 101 is in the form of an attachment.

If the process 400 determines there is not a phrase detection, then the process 400 determines if there is more content to analyze (414). If the process 400 determines there is more content to analyze, then the process 400 receives more content (402). Otherwise, the process 400 authorizes the content. For example, the phrase detector 110 may allow distribution of the content 101 if the content 101 is fully scanned and there are no detections of known phrases.

Figure 5:
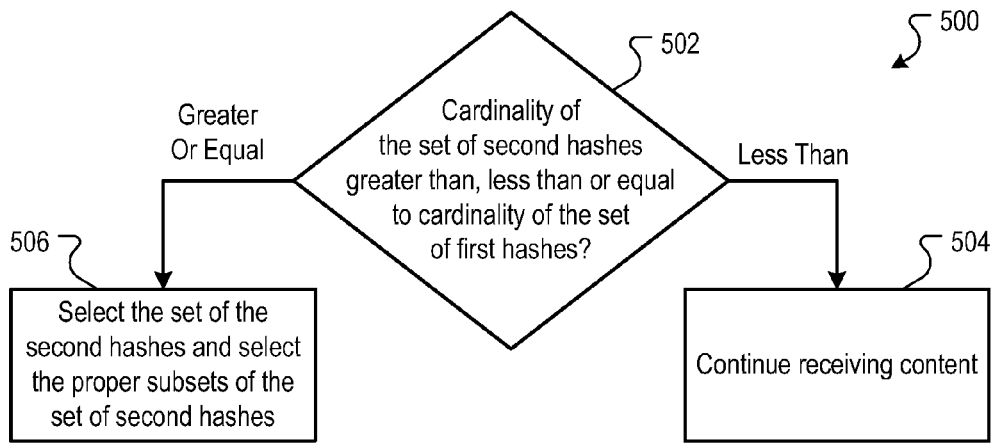
FIG. 5 is a flow diagram of an example process for selecting hashes of content terms.

FIG. 5 is a flow diagram of an example process 500 for selecting hashes of content terms. The process 500 can, for example, be used in the phrase detection system 100 of FIG. 2B.

The process 500 determines if the cardinality of the set of second hashes is greater than, less than, or equal to cardinality of the set of first hashes (502). For example, the phrase detector 110 can determine if the number of content term hashes in the window buffer 130 is greater than, less than or equal to the cardinality of the smallest set of phrase terms, such as the length of the smallest known phrase to be detected.

If the cardinality of the set of second hashes is less than the cardinality of the set of first hashes, then the process 500 continues to receive content (504). For example, the phrase detector 110 can continue to fill the window buffer 130 until enough content term hashes are stored to begin a phrase detection.

If the cardinality of the set of second hashes is greater than or equal to the cardinality of the set of first hashes, then the process 500 select the set of the second hashes and select the proper subsets of the set of second hashes (506). For example, the phrase detector 110 can select the set of the second hashes and select the proper subsets of the set of second hashes to process for phrase detections.

Figure 6:
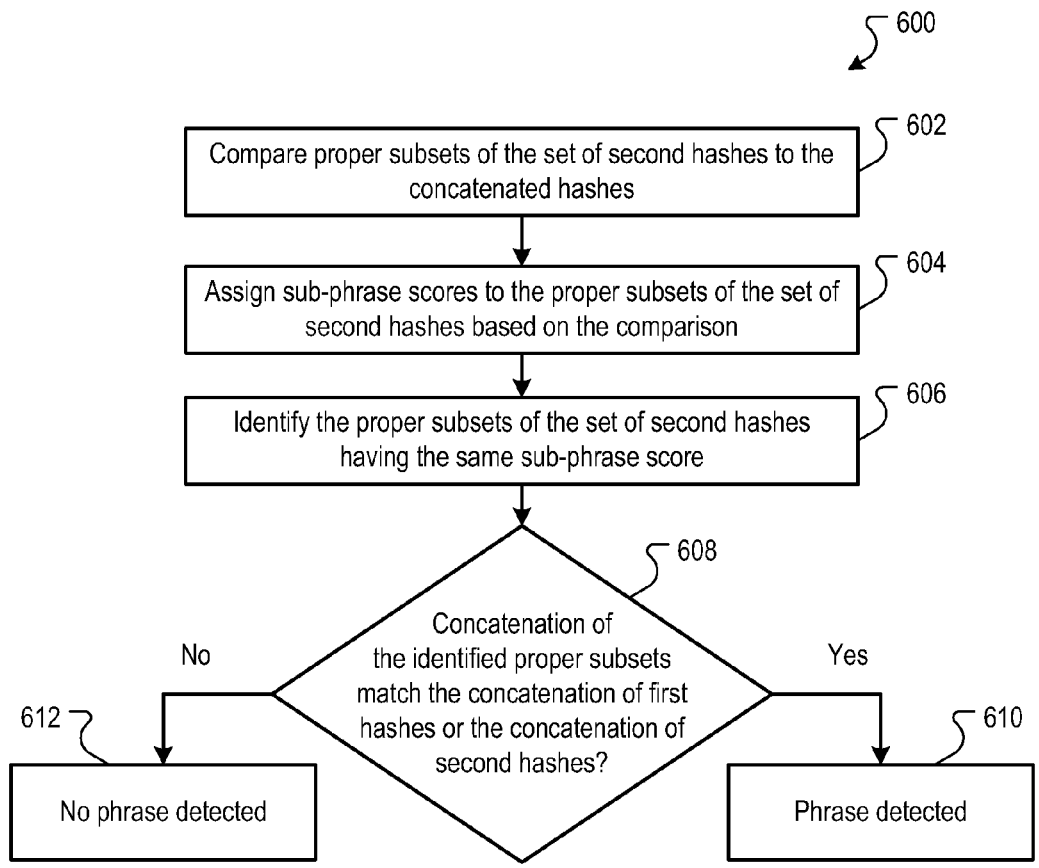
FIG. 6 is a flow diagram of another example process for detecting phrases in distributed content.

FIG. 6 is a flow diagram of another example process 600 for detecting phrases in distributed content. The process 600 can, for example, be used in the phrase detection system 100 of FIG. 2B.

The process 600 compares proper subsets of the set of second hashes to the concatenated hashes (602). For example, the phrase detector 110 can compare proper subsets, e.g., unigrams and bigrams hashes of the content term hashes to the concatenated hashes stored in the phrase data store 120.

The process 600 assigns sub-phrase scores to the proper subsets of the set of second hashes based on the comparison (604). For example, the phrase detector 110 can assign scores to the proper subsets of the set of second hashes in accordance with the scores in Table 2.

The process 600 identifies the proper subsets of the set of second hashes having the same sub-phrase score 606. For example, the phrase detector 110 can identify unigrams or bigrams having common scores, as described with respect to Tables 4 and 5.

The process 600 determines if a concatenation of the identified proper subsets match the concatenation of first hashes or the concatenation of second hashes (608). For example, the phrase detector 110 can determine if a hash of a concatenation of identified proper subsets of hashes of content terms is equal to a hash in Table 2, which includes concatenations of first hashes and concatenations of second hashes for first and second phrase terms, e.g., P1 and P2.

If the process 600 identifies a match, then the process 600 determines that a phrase is detected (610). For example, the phrase detector 110 can generate a data signal indicative of a phrase detection, and initiate one or more handling processes.

If the process 600 does not identify a match, then the process 600 determines that no phrase is detected (612). For example, the phrase detector 110 can determine that no phrase is detected, and process addition content or allow the content currently being processed.

Figure 7:
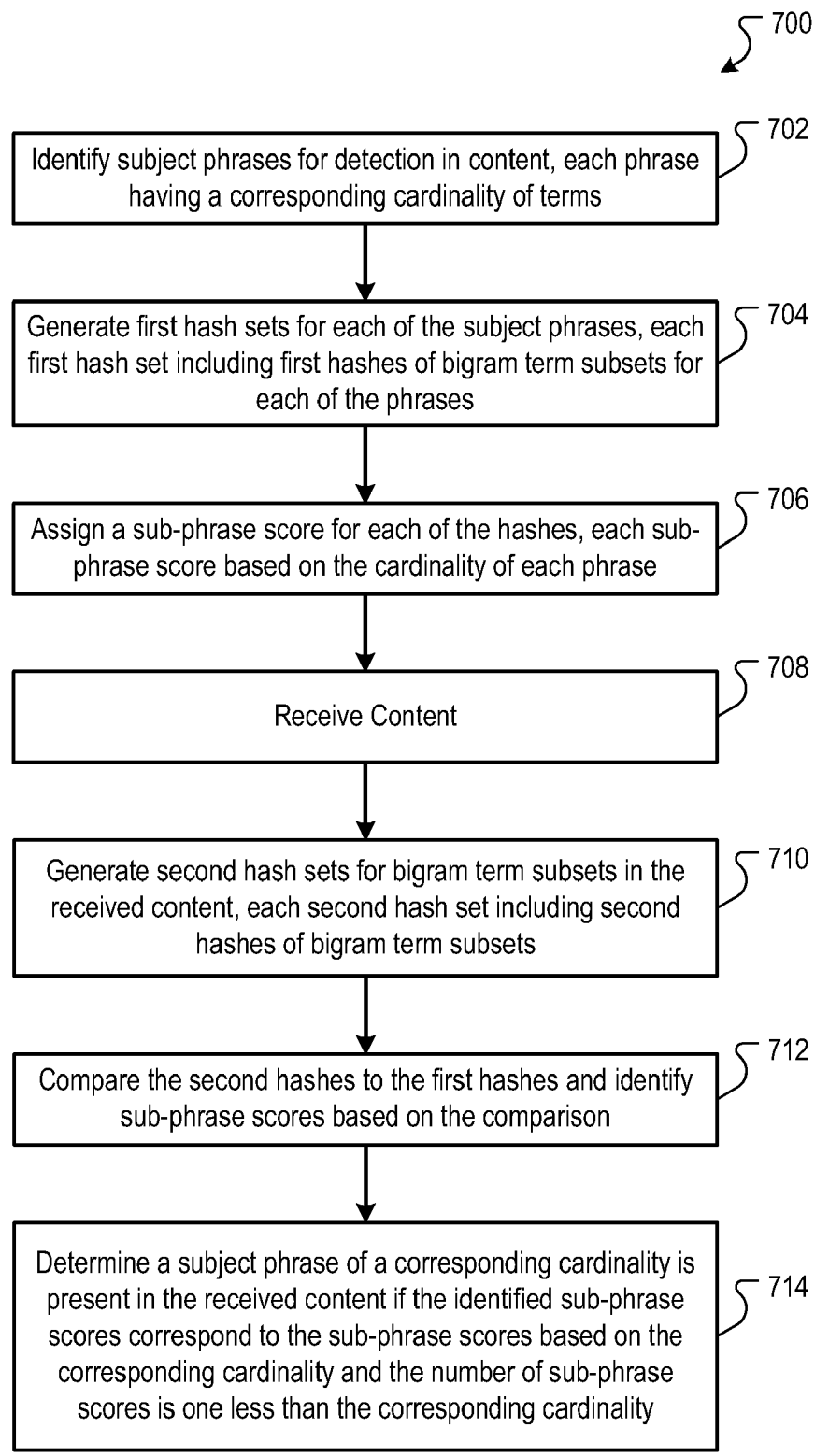
FIG. 7 is a flow diagram of another example process for detecting phrases in distributed content.

FIG. 7 is a flow diagram of another example process 700 for detecting phrases in distributed content. The process 700 can, for example, be used in the phrase detection system 100 of FIG. 2B.

The process 700 identifies subject phrases for detection in content, each phrase having a corresponding cardinality of terms (702). For example, the phrase detector 110 can identify terms such as "Privileged and Confidential," having a corresponding cardinality of three terms, for detection in content, and other phrases, such as "Attorney Client Privileged Communication."

The process 700 generates first hash sets for each of the subject phrases, each first hash set including first hashes of bigram term subsets for each of the phrases (704). For example, the phrase detector 110 can generate hashes for "Privileged and" and "and Confidential."

The process 700 assigns a sub-phrase score for each of the hashes, each sub-phrase score based on the cardinality of each phrase (706). For example, the phrase detector 110 can generate sub-phrase scores for the hashes of "Privileged and" and "and Confidential," and the scores can be based on the cardinality of three.

The process 700 receives content (708). For example, the phrase detector 110 can receive and e-mail communication, a document, or some other content.

The process 700 generates second hash sets for bigram term subsets in the received content, each second hash set including second hashes of bigram term subsets (710). For example, the phrase detector 110 can generate bigram term subsets for each pair of words in the content.

The process 700 compares the second hashes to the first hashes and identifies sub-phrase scores based on the comparison (712). For example, the phrase detector 110 can compare hashes of the bigram subsets in a phrase window to the bigram hashes the process generated. Based on this comparison, sub-phrase scores for matching hashes can be identified, e.g., the sub-phrase scores for the hashes of "Privileged and" and "and Confidential," if the content includes the words "Privileged and Confidential."

The process 700 determines a subject phrase of a corresponding cardinality is present in the received content if the identified sub-phrase scores correspond to the sub-phrase scores based on the corresponding cardinality and the number of sub-phrase scores is one less than the corresponding cardinality (714). For example, the phrase detector 110 can determine that the phrase "Privileged and Confidential" is present if two consecutive hashes have the sub-phrase scores corresponding to a big-gram hash for a trig ram phrase.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   receiving at a computing device within a phrase detection system a set of phrase terms of a phrase, the phrase terms being in first ordinal positions, and the phrase terms are indicative of data leakage;
   generating a set of first hashes by the phrase detection system, the set of first hashes including a first hash of each of the phrase terms;
   generating concatenated hashes from the set of first hashes by the phrase detection system, the concatenated hashes including a concatenation of the set of first hashes according the first ordinal positions of the phrase terms, and concatenations of proper subsets of the set of first hashes according to the first ordinal positions of the phrase terms;
   using the first set of hashes and the concatenated hashes by the phrase detection system for phrase detection in content with noise terms intermixed between phrase terms in the content, wherein the noise terms comprise terms, words and other data that when hashed do not match one of the first set of hashes, and wherein the noise terms are ignored in the phrase detection;
   receiving content, the content including content terms in second ordinal positions;
   generating a set of second hashes, the set of second hashes includes a second hash for each of the content terms;
   selecting the second hashes according to an increasing order of the second ordinal positions and sub-phrase scores;
   comparing the selected second hashes of the content terms to the concatenated hashes and the first hashes; and
   determining a phrase detection of the phrase has occurred if selected second hashes match at least one comparison to the concatenated hashes or first hashes:
   wherein selecting the second hashes according to the increasing order of the second ordinal positions and the sub-phrase scores comprises:
      comparing the cardinality of the set of second hashes to the cardinality of the set of first hashes;
      selecting the set of second hashes when the cardinality of the set of second hashes is equal to the cardinality of the set of first hashes; and
      selecting the set of the second hashes and selecting proper subsets of the set of second hashes according to the second ordinal positions and the sub-phrase scores when the cardinality of the set of second hashes is greater than the cardinality of the set of first hashes.

2. The method of claim 1, further comprising associating sub-phrase scores to the first hashes and the concatenations of the proper subsets of the set of first hashes.

3. The method of 1, wherein comparing the selected second hashes of the content terms to the concatenated hashes and the first hashes comprises comparing the sub-phrase scores in order of ascending values.

4. The method of claim 1, wherein the proper subsets of the set of second hashes include only proper subsets having a cardinality of two or less.

5. The method of claim 1, wherein selecting the second hashes according to an increasing order of the second ordinal positions and the sub-phrase scores comprises identifying proper subsets of the set of second hashes having the same sub-phrase score.

6. The method of claim 1, wherein generating the set of second hashes comprises:
   generating a second hash for a received content term;
   comparing the second hash to the set of first hashes; and
   including the second hash in the set of second hashes if the second hash is included in the set of first hashes.

7. The method of claim 6, further comprising:
   determining if a noise margin has been exceeded if the second hash is not in the set of first hashes; and
   if the noise margin has been exceeded, then emptying the set of second hashes.

8. The method of claim 1, further comprising:
   receiving content, the content including content terms in second ordinal positions;
   generating a set of second hashes, the set of second hashes includes a second hash for each of the content terms;
   selecting the second hashes according to an increasing order of the second ordinal positions;
   comparing the selected second hashes of the content terms to the concatenated hashes and the first hashes;
   determining a phrase detection of the phrase has occurred if selected second hashes match at least one comparison to the concatenated hashes or first hashes.

9. The method of 8, wherein selecting the second hashes according to an increasing order of the second ordinal positions comprises selecting proper subsets of set of second hashes according to the second ordinal positions of the content terms.

10. The method of claim 8, wherein selecting the second hashes according to the increasing order of the second ordinal positions comprises:
    comparing the cardinality of the set of second hashes to the cardinality of the set of first hashes;
    if the cardinality of the set of second hashes is equal to the cardinality of the set of first hashes, then selecting the set of second hashes; and
    if the cardinality of the set of second hashes is greater than the cardinality of the set of first hashes, then selecting the set of the second hashes and selecting proper subsets of the set of second hashes according to the second ordinal positions and the sub-phrase scores.

11. A computer-implemented method, comprising:
    receiving a first set of phrase terms for a first phrase at a computing device within a phrase detection system, the first phrase terms being in first ordinal positions and the first set of phrase terms having a first cardinality, and the phrase terms are indicative of data leakage;

receiving a second set of phrase terms for a second phrase at the phrase detection system, the second phrase terms being in second ordinal positions and the second set of phrase terms having a second cardinality that is greater than the first cardinality;

generating a set of first hashes for each of the phrase terms by the phrase detection system;

generating concatenated hashes from the first hashes by the phrase detection system, the concatenated hashes including a concatenation of the first hashes for the first set of phrase terms according to the first ordinal positions, a concatenation of the first hashes for the second set of phrase terms according to the second ordinal positions, concatenations of proper subsets of the set of first hashes in the first set according to the first ordinal positions, and concatenations of proper subsets of the set of first hashes in the second set according to the second ordinal positions;

using the first set of hashes and the concatenated hashes for phrase detection by the phrase detection system in content with noise terms intermixed between phrase terms in the content, wherein the noise terms comprise terms, words and other data that when hashed do not match one of the first set of hashes, and wherein the noise terms are ignored in the phrase detection;

receiving content, the content including content terms in third ordinal positions;

generating a set of second hashes, the set of second hashes includes a second hash for each of the content terms;

selecting the second hashes according to an increasing order of the third ordinal positions and the sub-phrase scores;

comparing the selected second hashes of the content terms to the concatenated hashes and the first hashes; and determining a phrase detection of one of the first phrase and second phrase has occurred if selected second hashes match at least one comparison to the concatenated hashes or first hashes;

wherein selecting the second hashes according to the increasing order of the third ordinal positions comprises:
  comparing the cardinality of the set of second hashes to the first cardinality;
  selecting the set of second hashes when the cardinality of the set of second hashes is equal to the first cardinality; and
  selecting the set of the second hashes and selecting proper subsets of the set of second hashes according to the second ordinal positions of the content terms and the sub-phrase scores when the cardinality of the set of second hashes is greater than the first cardinality.

12. The method of claim 11, further comprising associating sub-phrase scores to the concatenations of proper subsets of the set of first hashes in the first set and concatenations of proper subsets of the set of first hashes in the second set.

13. The method of 11, wherein selecting the second hashes according to an increasing order of the third ordinal positions and the sub-phrase scores comprises selecting proper subsets of the set of second hashes according to the third ordinal positions of the content terms, each of the selected proper subsets having a common sub-phrase score.

14. The method of claim 13, wherein the proper subsets of the second hashes include only proper subsets having a cardinality of two or less.

15. The method of claim 11, wherein generating the set of second hashes comprises:
  generating a second hash for a received content term;
  comparing the second hash to the set of first hashes; and
  including the second hash in the set of second hashes if the second hash is included in the set of first hashes.

16. The method of claim 11, further comprising:
  receiving content, the content including content terms in third ordinal positions;
  generating a set of second hashes, the set of second hashes includes a second hash for each of the content terms;
  selecting the second hashes according to an increasing order of the third ordinal positions;
  comparing the selected second hashes of the content terms to the concatenated hashes and the first hashes; and
  determining a phrase detection of one of the first phrase and second phrase has occurred if selected second hashes match at least one comparison to the concatenated hashes or first hashes.

17. A computer program product stored in a non-transitory computer readable medium and including instructions executable by a processing system, and that upon such execution cause the processing system to perform operations comprising:
  receiving a set of phrase terms of a phrase, the phrase terms being in a first ordinal positions, and the phrase terms are indicative of data leakage;
  generating a set of first hashes, the set of first hashes including a first hash of each of the phrase terms;
  generating concatenated hashes from the set of first hashes, the concatenated hashes including a concatenation of the set of first hashes according the first ordinal positions of the phrase terms, and concatenations of proper subsets of the set of first hashes according to the first ordinal positions of the phrase terms;
  receiving content, the content including content terms in second ordinal positions, and the content terms comprising some of the phrase terms intermixed with intervening noise terms;
  generating a set of second hashes, the set of second hashes includes a second hash for each of the content terms and ignores the intervening noise terms;
  selecting the second hashes according to an increasing order of the second ordinal positions;
  comparing the selected second hashes of the content terms to the concatenated hashes and the first hashes over a window of a size based on a number of intervening noise terms;
  determining a phrase detection of the phrase has occurred if selected second hashes match at least one comparison to the concatenated hashes or first hashes, wherein the noise terms comprise terms, words and other data that when hashed do not match one of the first set of hashes, and wherein the noise terms are ignored in the phrase detection;
  wherein selecting the second hashes according to the increasing order of the second ordinal positions comprises:
    comparing the cardinality of the set of second hashes to the cardinality of the set of first hashes;
    selecting the set of second hashes when the cardinality of the set of second hashes is equal to the cardinality of the set of first hashes; and
    selecting the set of the second hashes and selecting proper subsets of the set of second hashes according to the second ordinal positions and the sub-phrase scores when the cardinality of the set of second hashes is greater than the cardinality of the set of first hashes.

* * * * *